(12) United States Patent
Cunefare et al.

(10) Patent No.: US 9,884,949 B1
(45) Date of Patent: Feb. 6, 2018

(54) SYNTACTIC FOAM WITH RESIDUAL INTERNAL PRESSURIZATION

(71) Applicant: Georgia Tech Research Corporation, Atlanta, GA (US)

(72) Inventors: Kenneth A. Cunefare, Atlanta, GA (US); Elliott Gruber, Atlanta, GA (US); William John Koros, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 21 days.

(21) Appl. No.: 15/096,222

(22) Filed: Apr. 11, 2016

Related U.S. Application Data

(60) Provisional application No. 62/145,939, filed on Apr. 10, 2015.

(51) Int. Cl.
  *C08J 9/32* (2006.01)
  *E04B 1/84* (2006.01)

(52) U.S. Cl.
  CPC .................................. *C08J 9/32* (2013.01); *E04B 1/84* (2013.01); *C08J 2201/032* (2013.01); *C08J 2203/22* (2013.01); *C08J 2375/04* (2013.01); *C08J 2383/04* (2013.01)

(58) Field of Classification Search
  CPC ..... C08J 9/32; C08J 2201/032; C08J 2203/22
  USPC .................................................. 523/218, 219
  See application file for complete search history.

(56) References Cited

U.S. PATENT DOCUMENTS 7,202,284 B1 * 4/2007 Limerkens ............. C08G 18/08
                                                              521/113

OTHER PUBLICATIONS

Gruber and Cunefare, "Material Modeling of High-Pressure Compliant Syntactic Foams," ASME/Bath Fluid Power and Motion Control Symposium; Chicago, Illinois, Oct. 2015.
Gruber, et al., "Comparison of Noise Control Effectiveness Between Bladder-Style and Liner-Style Hydraulic Noise Control Cevices," submitted to Noise Control Engineering Journal, Feb. 2016. Also, appeared as paper IN2015-215, Proceedings of Inter-Noise 2015, Aug. 9-12, 2015, San Francisco, CA.

* cited by examiner

*Primary Examiner* — Edward Cain
(74) *Attorney, Agent, or Firm* — Troutman Sanders LLP; Ryan A. Schneider

(57) ABSTRACT

A syntactic foam of a host matrix and inclusions dispersed in the host matrix, wherein at least a portion of the inclusions include microspheres containing a charge gas and having an internal pressure of greater than 0.1 MPa.

18 Claims, 11 Drawing Sheets

-Prior Art-

SYNTACTIC FOAM WITH RESIDUAL INTERNAL PRESSURIZATION

CROSS-REFERENCE TO RELATED APPLICATIONS

This application claims the benefit of U.S. Provisional Application No. 62/145,939 filed 10 Apr. 2015 the entire contents and substance of which is hereby incorporated by reference.

BACKGROUND OF THE INVENTION

1. Field of the Invention

The present invention relates to composite materials synthesized by filling a metal, polymer, or ceramic matrix with microspheres. The present invention relates more particularly to syntactic foams with residual internal pressurization and methods of manufacturing such foams.

2. Description of Related Art

Syntactic foam is a term of art describing foam that is formed by the addition of a filler inclusion to a host matrix material. Common syntactic foams are comprised of microballoons (or microspheres) in a resin, ceramic, or polymer matrix. Voids within the host matrix material are created by the hollow microspheres.

The microspheres within a syntactic foam may be modeled as thin-walled spherical shells that buckle at a critical pressure:

$$P_{cr} = \frac{2Et^2}{r^2\sqrt{3(1-v^2)}} \quad (1)$$

where E is the Young's modulus of the material of the shell, v is the Poisson's ratio of the shell, and t and r are the thickness and radius of the shell, respectively.

The critical pressure is the pressure difference across the shell; an elevated internal pressure would require a similarly elevated external pressure to buckle the shell. Once the hydrostatic system pressure exceeds the critical pressure, the sphere buckles and acts as a compliant void that can be approximated as a gas bubble.

FIG. 1(a) depicts microspheres in a pre-buckled state, while FIG. 1(b) depicts microspheres in a post-buckled state. Some of the spheres in FIG. 1(b) have not buckled despite being exposed to the same hydrostatic pressure. This is caused by manufacturing variance when making the spheres such that are associated differences in critical pressure.

As system pressure increases the buckled microspheres will further shrink in size due to compression of the gas remaining in the void space of the buckled microspheres, reducing their contribution to the overall compliance of the foam, and in noise control uses, reducing the noise control effectiveness of the foam.

Materials like syntactic foam have been investigated for use in noise control technologies, namely in hydraulic systems. Hydraulic power has broad applications in industries ranging from manufacturing and construction, through to its use in off-road and on-road vehicles. The pumps and actuators used in such systems induce undesirable variations in the system pressure, called a pressure ripple, that can lead to excessive noise, vibration, premature component failure, and unacceptable control response.

Manufacturers and system integrators often use compliance within a hydraulic system as a means to reduce and control the impact of this pressure ripple. However, the means to implement this compliance requires the use of additional components, such as accumulators and tuning hoses. In-line hydraulic noise suppressors are an example of a compliant device with an express design function of reducing the noise from hydraulic systems.

Pressure variations within the working fluid of a hydraulic system cause problems within the system and in the surrounding air. The in-fluid pressure variation, also known as fluid-borne noise, places additional stress on the sealing surfaces potentially exceeding their rated capacity and causing a leak. In addition, the pressure variations cause end-effectors to move since their position is dependent on pressure; the variations in displacement make tasks dependent on precision difficult without significant control.

The fluid-borne noise couples with structural components to cause structure-borne vibration. The cyclic nature of the noise creates fatigue cycles that shorten the lifetime of system components. The shuddering of the machine is also uncomfortable for the operator. The vibration of the structural components also couples with the surrounding air to create airborne breakout noise. The breakout noise can reach hazardous levels, though lower levels of noise will cause problems with communication between workers. Treatment of the fluid-borne noise will reduce the level of structure-borne vibration and airborne breakout noise. For example, New Holland Agriculture conducted a poll of their customers and found low levels of noise within the operator's cabin is the third most important factor when purchasing new equipment, following adequate power and fuel economy, underscoring the need for a noise treatment option over the entire range of hydraulic system pressure, from 0 to 35 MPa.

Hydraulic noise can be treated by adding compliance to the system or using discrete components such as a side-branch resonator or an in-line noise suppressor; the impedance mismatch and damping within the discrete devices reduces the amount of noise propagating downstream, while compliance in the system serves to smooth out sharp pressure transients, reducing overall noise levels.

Adding compliance is a more desirable solution because of its relative compactness when compared to resonant noise control techniques. Noise control behavior of ¼- and ½-wave resonators is well known; the size of the devices scales in proportion to the wavelength of interest. According to acoustic theory, ¼- and ½-wave resonators should only exhibit high transmission loss in the frequencies associated with the wavelength multiples of the respective devices.

An example 9-piston axial piston pump rotating at 1500 RPM produces a fundamental frequency of 225 Hz in the pressure ripple. The speed of sound in hydraulic fluid is approximately 1400 m/s, with the exact speed of sound depending on the fluid, operating condition and the compliance of the hydraulic system. For this example, the 225 Hz component of the pressure disturbance would have a wavelength of 6.22 meters; ¼- and ½-wave resonators would be as long as their respective fraction of a wavelength, which requires devices that are impractically large.

The performance of a noise control treatment can be characterized by its transmission loss, the ratio of incident acoustic power to transmitted acoustic power:

$$TL = 10 \log_{10} W_i/W_t = 10 \log_{10} T_\pi, \quad (2)$$

where W is the sound power, i indicates the incident wave, t indicates the transmitted wave and $T_\pi$ is the sound power transmission coefficient.

A higher value for TL indicates more effective noise control. The sound power transmission coefficient depends on the impedances across an interface (where, at low frequencies/long wavelengths, a discrete device may be considered to represent a single effective impedance interface), such that:

$$T_\pi = \frac{4Z_1 Z_2 S_1 S_2}{(Z_1 S_2 + Z_2 S_1)^2}. \quad (3)$$

Here, Z is the impedance of the fluid and S is the cross sectional area of the flow path (pipe or hose diameters in hydraulic systems), with the upstream values given the subscript 1 and the downstream values given the subscript 2. The upstream values are assumed fixed; therefore, reducing the downstream impedance, $Z_2$, will reduce the power in the noise propagating downstream. Adding compliance to a system reduces the downstream impedance.

A commercially-available method to add compliance to a system for explicit noise control purposes is a bladder-style suppressor. Bladder-style suppressors, shown schematically in FIG. 2 add compliance through a pressurized volume of gas; the pressure of the gas is known as charge pressure.

The relationship between the charge pressure and system pressure determine the effectiveness of the device. The devices exhibit the highest transmission loss when the charge pressure is approximately 90% of system pressure; however, the devices suffer from a decrease in performance when the charge pressure is higher than the system pressure.

For example, the transmission loss exhibited by a suppressor operating at a system pressure of 10.3 MPa and a variety of charge pressures is shown in FIG. 3. At a charge pressure of 11.3 MPa, the overcharged case, low transmission loss is exhibited, demonstrating that bladder-style suppressors do not perform well when charge pressure is higher than system pressure. The charge pressure of 9.27 MPa exhibits the highest transmission loss (at 10.3 MPa system pressure). But, lower charge pressures exhibit lower transmission loss performance. The relatively narrow range of charge pressures which exhibit high noise control performance limits the effectiveness of bladder-style suppressor in systems operating over a broad range of system pressures; many systems have operational ranges from 0 to 35 MPa that requires a more robust, less pressure sensitive noise control solution.

The efficacy of an in-line suppressor implemented using a syntactic foam liner has been studied. The transmission loss exhibited by a commercial bladder-style suppressor, and a suppressor with a syntactic foam liner, are presented in FIG. 4. The system pressure was 2.76 MPa for both cases; the bladder-style suppressor was charged to 1.38 MPa as recommend by the manufacturer. The suppressor bodies were of the same approximate dimensions, and were designed for the same flow conditions.

Below a frequency of 250 Hz both suppressors exhibit very similar transmission loss behavior. In the frequency range of 250 Hz to 1300 Hz, the transmission loss exhibited by the liner-style suppressor is higher by approximately 4 dB, a significant margin in noise control. This frequency range is also the frequency range that carries the most acoustic energy of interest to the hydraulics community; the elevated noise control in this frequency range is extremely beneficial to effective noise treatment overall.

In the frequency range between 1300 and the 1750 Hz, the bladder-style suppressor exhibits transmission loss approximately 3 dB higher than the liner-style suppressor. Above 1750 Hz the liner-style suppressor exhibits much higher transmission loss (beyond the capabilities of the test rig to resolve, which is why so much data is absent for the lined suppressor above 2200 Hz) but there is very little spectral content of interest to the hydraulics community in this higher frequency range.

The current generation of syntactic foam loses compliance at system pressures above 7 MPa, representing a key technology gap that must be bridged in order for syntactic foams to have broad applicability in the hydraulics industry. The conventional syntactic foam loses performance because the voids shrink in size under increasing stating pressure, reducing their volume fraction and associated contribution to the compliance of the foam. The reduction in compliance may be characterized through the material's bulk modulus; reduced compliance implies increase bulk modulus. The increase in bulk modulus (loss of compliance) of a current syntactic foam with respect to increasing system pressure can be seen in FIG. 5. In consequence of the loss of compliance, the current generation of syntactic foam is not a viable noise control solution above 7 MPa.

However, the hydraulics industry commonly employs system pressures above 7 MPa, with current products and systems using pressures to 35 MPa and above. Altering the behavior of the voids to limit their shrinkage under pressure would allow a new foam material to retain compliance to higher pressures and be a more effective noise control solution at elevated pressures, up to 35 MPa; this is one goal of the present invention—to bridge the current technology gap.

It is thus readily apparent that conventional noise control technologies are limited. It is thus an intention of the present invention to provide a syntactic foam with residual internal pressurization, such that the material is compliant under elevated pressure (up to 35 MPa), where effective compliance at elevated pressure is a critical factor for commercially-viable use of the material in noise control technologies applied to hydraulic systems.

BRIEF SUMMARY OF THE INVENTION

It is thus an intention of the present invention to provide a composite material with residual internal pressurization. In one exemplary embodiment, the present invention comprises a syntactic foam of polystyrene microspheres embedded or cast within a urethane host matrix. The utility of the material, for example, used as noise control in fluid hydraulic systems, was surprisingly found to be increased if at least a portion of the microspheres had a residual pressurization in them. The present invention relates to such syntactic foams and processes to manufacture it.

The microspheres can be pressurized through a process where they are exposed to gradually increasing pressure of a charge gas, such as nitrogen or isobutene. Once a desired internal pressure has been achieved, the microspheres can be treated, for example, to fluorinate the surface of the microspheres. This serves to greatly reduce the diffusion of the charge gas, such that the microspheres retain their internal pressurization during subsequent handling, mixing, and casting steps.

Further, the resulting syntactic foam in bulk or final cast form may itself be fluorinated, such that this overall bulk surface exhibits reduced gas diffusion. The fluorination of the bulk material further extends to longevity of the residual gas charge.

A beneficial advantage of the present invention having microspheres with residual pressurization is that it enables the material to be functional in systems with elevated static pressures (for example, hundreds-to-thousands of psi), such as for noise control or compliance control in hydraulic systems.

Applications for the present invention include use as a lining for hydraulic components. Also, the hydraulics industry has sought the properties of the present invention for introducing engineered compliance into systems and components. Commercial applications include in-line suppressors, as well as other devices and components employed in the hydraulics industry.

The present embodiment of a syntactic foam is useful for its noise control and compliance addition function at much higher elevated static pressures (hydraulic system pressures) as compared to conventional syntactic foams.

Noise control effectiveness is a function of compliance. Syntactic foam comprises a host matrix and inclusions or voids dispersed in the host matrix. Loss of compliance comes from shrinking of post-collapsed voids. Altering voids to limit/prevent collapse makes the present syntactic foam compliant at higher pressures and more effective as a noise control solution.

In an exemplary embodiment of the present invention, the internal pressure of the microspheres is increased above ambient to limit/prevent post-collapsed voids from shrinking. The internal pressure can be increased by permeating gas through the microsphere boundary. Then, a step of fluorinating the microsphere boundary limits/prevents gas permeating out of the microsphere.

In exemplary embodiments of the present invention, with material targeting compliance at 35 MPa (5000 psi), microspheres manufactured from different materials are needed, and with different geometric configurations, than are conventionally available.

The present syntactic foams can be synthesized by filling a metal, polymer, or ceramic host matrix with inclusions dispersed in the host matrix. At least a portion of the inclusions comprise microspheres having an internal pressure above ambient. The presence of microspheres results in lower density, higher specific strength, lower coefficient of thermal expansion, and, in some cases, radar or sonar transparency.

Tailorability is one of the biggest advantages of the present invention. The host matrix can be selected from many types of, for example, metals, polymers, and ceramics. The microspheres can be designed in a variety of sizes and materials. The present invention can have a range of volume fraction of microspheres or use microspheres of different effective density.

In an exemplary embodiment, the present invention is a composite material comprising a host matrix and inclusions dispersed in the host matrix, wherein at least a portion of the inclusions comprise microspheres having an internal pressure of greater than 0.1 MPa.

At least a portion of the microspheres can have an internal pressure of greater than 1 MPa. At least a portion of the microspheres can have an internal pressure of greater than 5 MPa. At least a portion of the microspheres can have an internal pressure of between 5 MPa and 10 MPa.

At least a portion of the microspheres can comprise polymer microspheres.

The host matrix can comprise urethane. The host matrix can comprise silicone rubber.

At least a portion of the microspheres having an internal pressure of greater than 0.1 MPa can comprise a charge gas. The composition of the charge gas can comprise nitrogen. The composition of the charge gas can comprise isobutene.

In another exemplary embodiment, the present invention is a syntactic foam comprising a host matrix and inclusions dispersed in the host matrix, wherein at least a portion of the inclusions comprise microspheres containing a charge gas and having an internal pressure of between 1 MPa and 10 MPa.

At least a portion of the microspheres can have internal pressures different from one another, that is, not all microspheres need have a uniformly consistent internal pressure across all the microspheres. Microspheres can have varying internal pressures.

At least a portion of the microspheres can have charge gas compositions different from one another, that is, not all microspheres need have a uniformly consistent charge gas composition across all the microspheres. Microspheres can have varying charge gas compositions.

These and other objects, features and advantages of the present invention will become more apparent upon reading the following specification in conjunction with the accompanying drawing figures.

DETAIL DESCRIPTION OF THE INVENTION

Figure 1A:
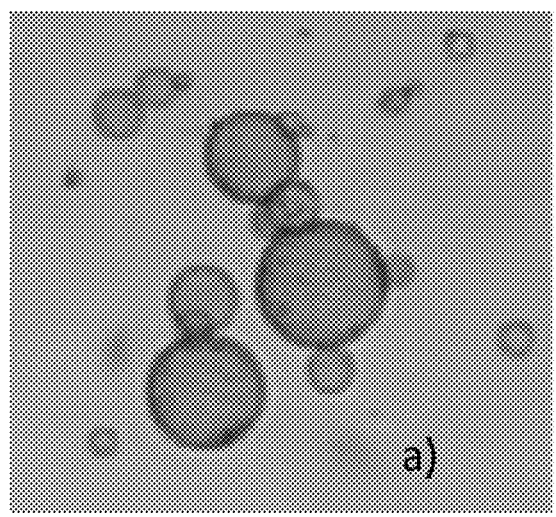
FIG. 1(a) shows pre-buckling spheres.
Figure 1B:
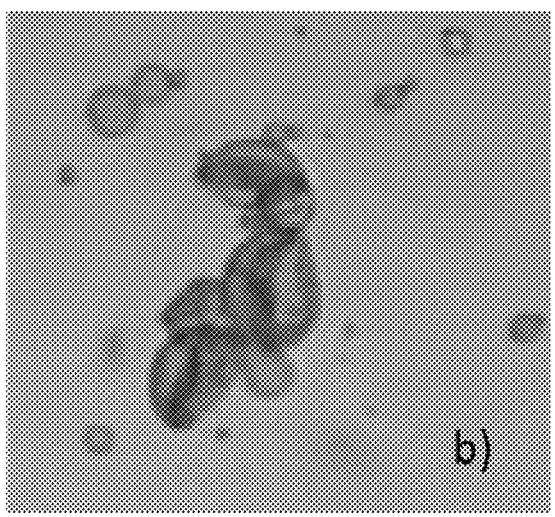
FIG. 1(b) shows post-buckling spheres.
Figure 2:
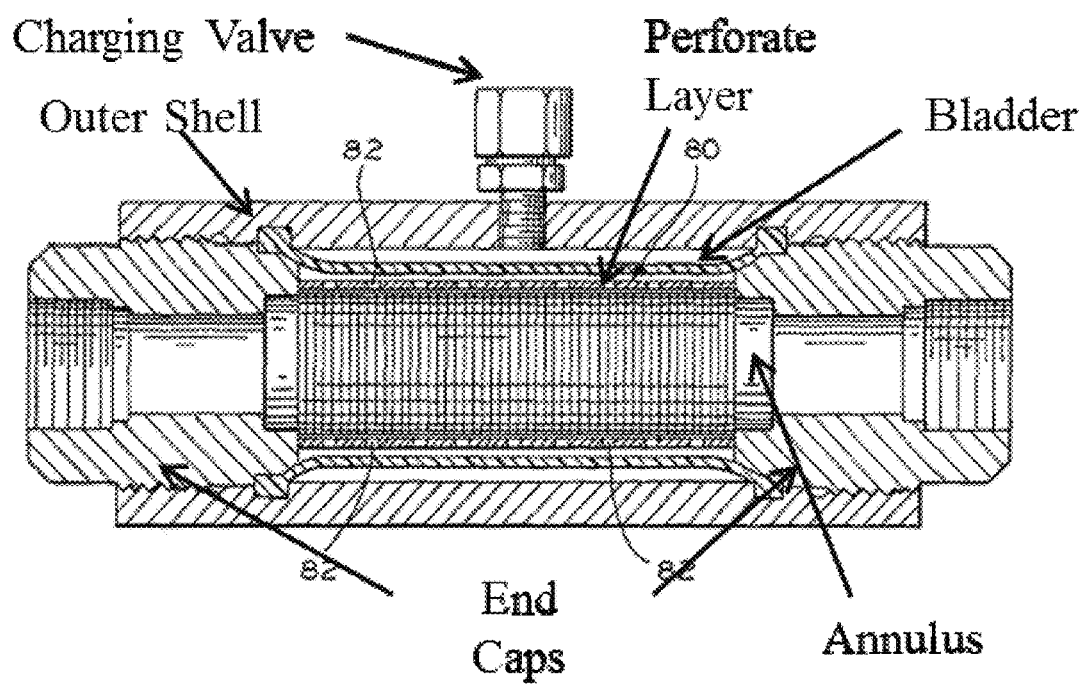
FIG. 2 is a prior art schematic of a bladder-style suppressor.
Figure 3:
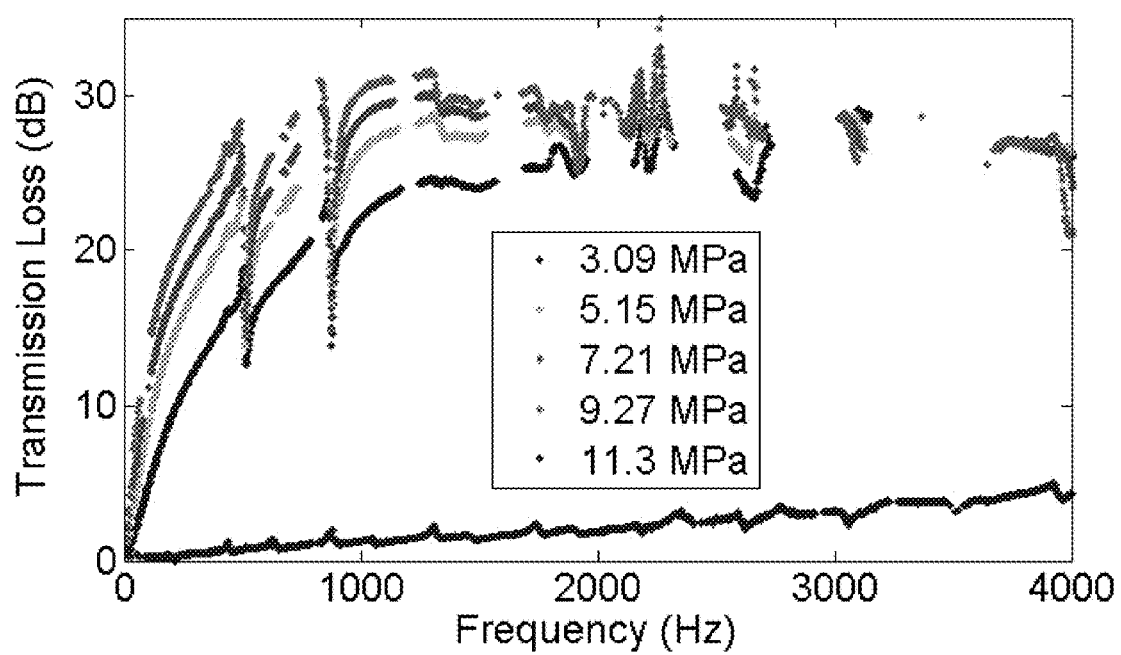
FIG. 3 is a graph of the transmission loss of a bladder-style suppressor at a system pressure of 10.3 MPa over a range of charge pressures.
Figure 4:
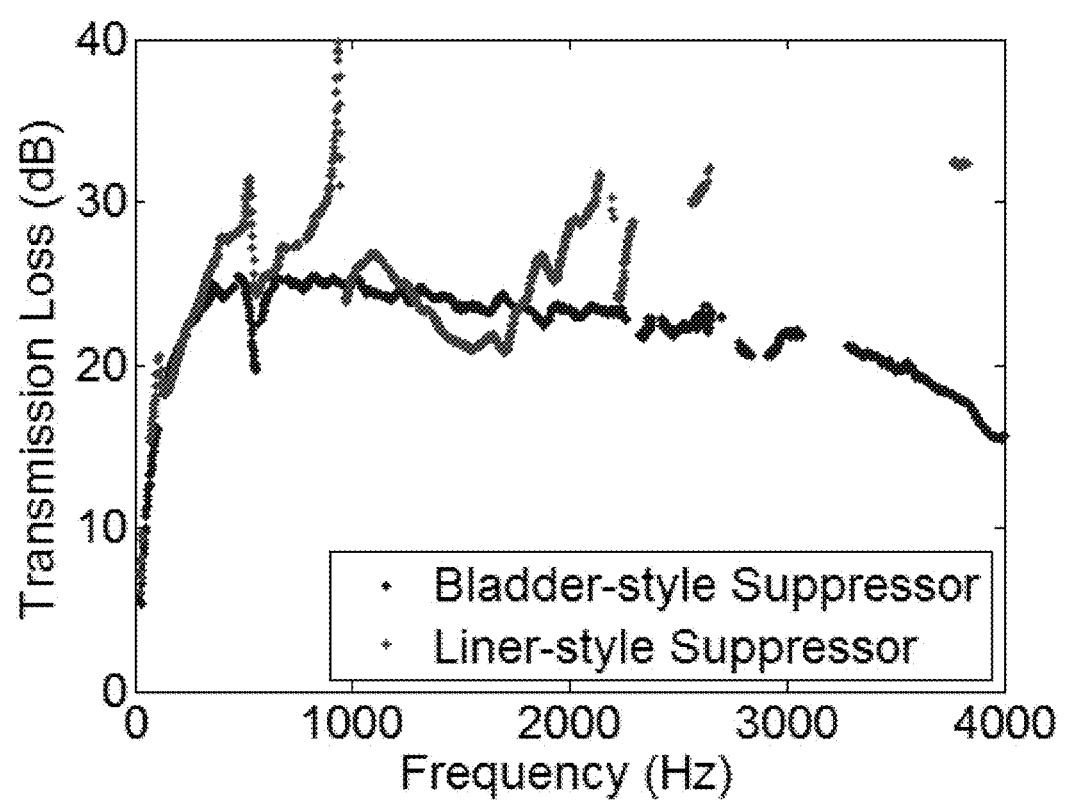
FIG. 4 is a graph of the transmission loss of a bladder-style suppressor and a liner style suppressor at 2.76 MPa.
Figure 5:
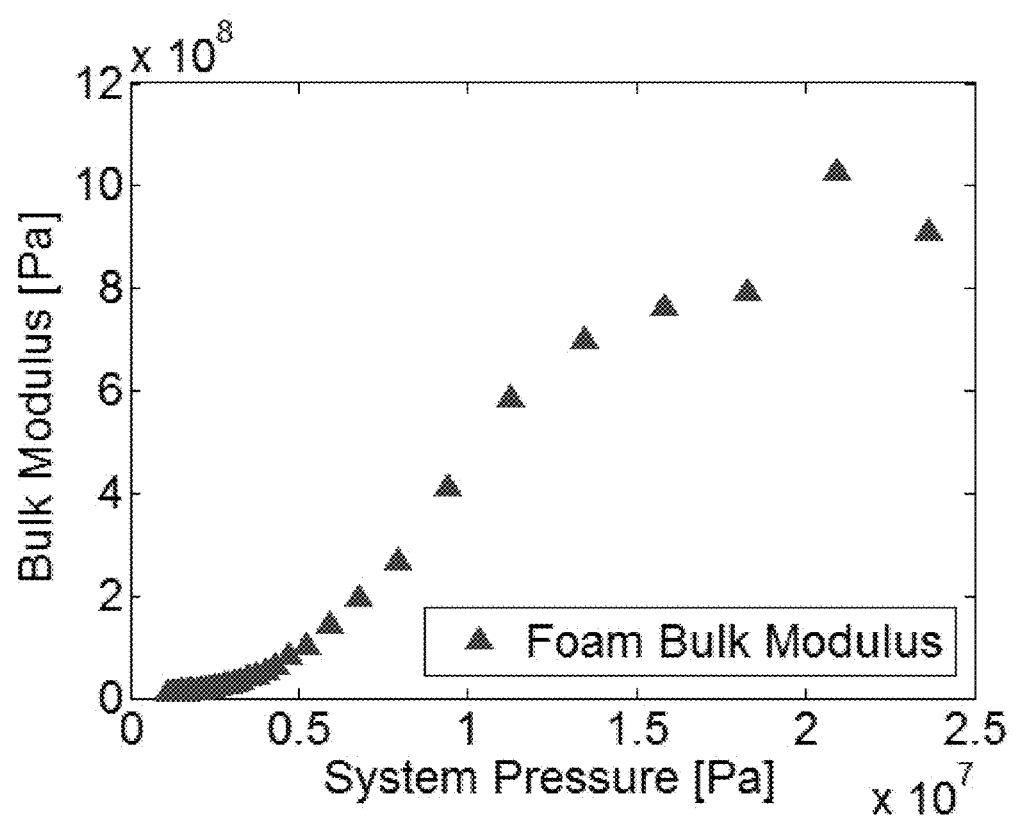
FIG. 5. is a graph of the bulk modulus of conventional syntactic foam vs. system pressure.

To facilitate an understanding of the principles and features of the various embodiments of the invention, various illustrative embodiments are explained below. Although exemplary embodiments of the invention are explained in detail, it is to be understood that other embodiments are contemplated. Accordingly, it is not intended that the invention is limited in its scope to the details of construction and arrangement of components set forth in the following description or illustrated in the drawings. The invention is capable of other embodiments and of being practiced or carried out in various ways. Also, in describing the exemplary embodiments, specific terminology will be resorted to for the sake of clarity.

It must also be noted that, as used in the specification and the appended claims, the singular forms "a," "an" and "the"

include plural references unless the context clearly dictates otherwise. For example, reference to a component is intended also to include composition of a plurality of components. References to a composition containing "a" constituent is intended to include other constituents in addition to the one named.

Also, in describing the exemplary embodiments, terminology will be resorted to for the sake of clarity. It is intended that each term contemplates its broadest meaning as understood by those skilled in the art and includes all technical equivalents which operate in a similar manner to accomplish a similar purpose.

Ranges may be expressed herein as from "about" or "approximately" or "substantially" one particular value and/or to "about" or "approximately" or "substantially" another particular value. When such a range is expressed, other exemplary embodiments include from the one particular value and/or to the other particular value.

Similarly, as used herein, "substantially free" of something, or "substantially pure", and like characterizations, can include both being "at least substantially free" of something, or "at least substantially pure", and being "completely free" of something, or "completely pure".

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified. Similarly, it is also to be understood that the mention of one or more components in a composition does not preclude the presence of additional components than those expressly identified.

The materials described as making up the various elements of the invention are intended to be illustrative and not restrictive. Many suitable materials that would perform the same or a similar function as the materials described herein are intended to be embraced within the scope of the invention. Such other materials not described herein can include, but are not limited to, for example, materials that are developed after the time of the development of the invention.

The present invention is a composite material comprising a host matrix and inclusions or voids dispersed in the host matrix, wherein at least a portion of the inclusions comprise microspheres having an internal pressure of greater than ambient, or as exemplary, greater than 0.1 MPa.

In syntactic foam of urethane, the voids due to the presence of polystyrene microspheres within the matrix; their behavior strongly impacts the properties of the material. With increasing system pressure, the microspheres buckle. Post-buckling, the shell of the sphere contributes negligible stiffness, and it is only the gas in remaining void space inside the buckled sphere that provides stiffness.

Below the critical pressure the microspheres stiffen the material, and above the critical pressure, the material is softer due to the much higher compliance of the gas in the voids within the buckled microspheres. The properties of this form of syntactic foam then, depends on the critical pressure of the microspheres, and the volume-pressure behavior of the voids after buckling of the microspheres.

The dependencies of the material's properties on the details of the microspheres and residual pressurization of the microspheres represent an opportunity for tailoring the material, and are the focus of the present invention. The present invention permits material tailoring through control over the internal pressure of the microspheres, which provides a great deal of design and manufacturing flexibility and cost efficiency, since changing the bulk material properties could be achieved by only changing the internal pressure, and little else in the process.

However, the current generation of syntactic foam stiffens with increasing system pressure, becoming ineffective as a noise control solution at system pressure above 7 MPa. This is not optimal.

The conventional foam becomes stiffer because the voids inside the buckled spheres lose volume in accordance to Boyle's law, PV=Constant, and their effect on the overall bulk modulus off the foam is reduced. The reduction of compliance lessens the effectiveness of the conventional foam as a noise control device.

Many systems operate at system pressures well above 7 MPa. A method that keeps the voids from excessive shrinkage without significantly effecting the compliance of the foam is necessary to treat the full range of system pressure, from 0 to 35 MPa.

At the initial stage of research into the present syntactic foams with residual internal pressurization and methods of manufacturing such foams, modeling and optimization techniques were investigated.

The present syntactic foams are multi-phase materials, and as such availed themselves to modeling methods valid for multiphase materials. Multiphase modeling is used to predict the equivalent material properties for a material formed by a host matrix and inclusions, such as syntactic foam.

Multiphase modeling only uses the known physical properties of the materials and their relative volume fractions in order to predict the effective properties of the composite. The process of replacing the host matrix and inclusions with a single material comprised of the effective properties is known as homogenization.

In order to homogenize a material, the focus is placed upon a single inclusion, known as the microscale, to inform the properties of the entire composite, known as the macroscale. On the microscale, a representative volume element (RVE) is created; the RVE has the same volume ratio of inserts to host matrix as the macroscale composite. The effective material properties of the entire composite are assumed to be the same as the effective properties of RVE. Therefore, by solving the simpler problem of calculating the effective properties of the RVE, the properties of the entire composite are known.

Figure 6:
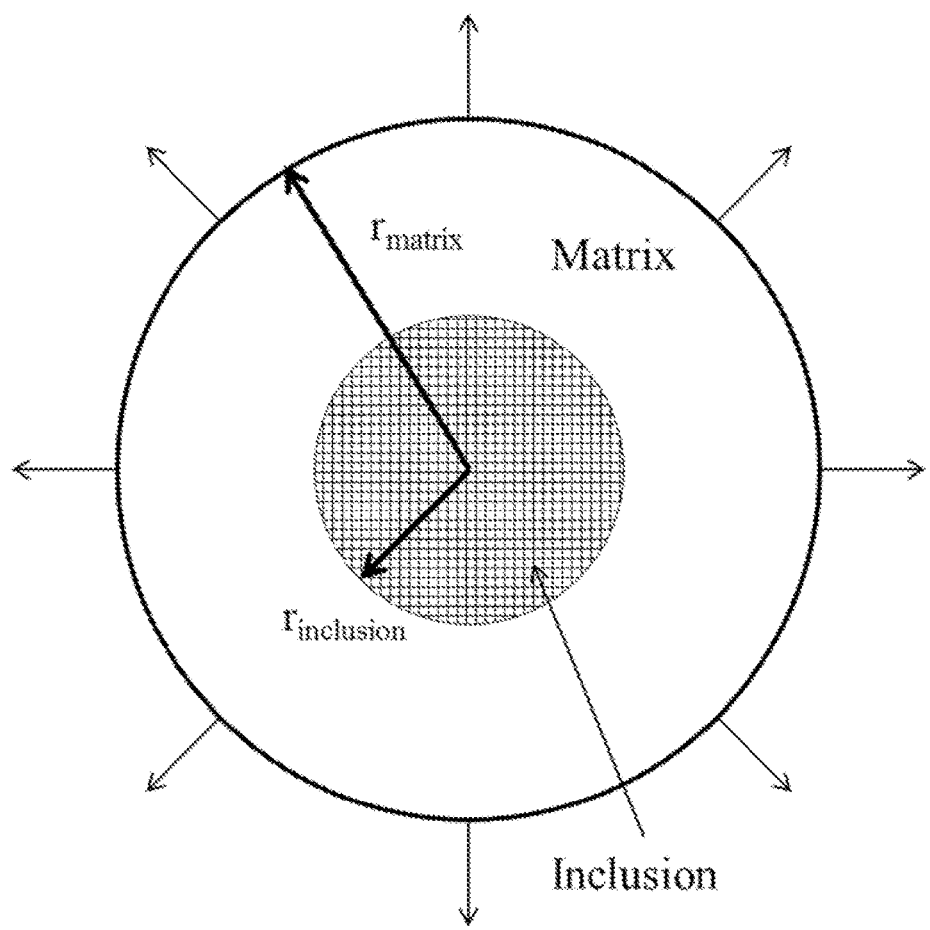
FIG. 6 illustrates the composite sphere model.

The composite spheres method uses strain energy in order to calculate the equivalent bulk modulus of a composite sphere, shown in FIG. 6. The strain energy for a linear-elastic homogenous isotropic medium is calculated by:

$$U_0 = \frac{1}{2}\int_V \sigma_{ij}^{(0)} \varepsilon_{ij}^{(0)} dV \tag{4}$$

and Hooke's law in three-dimensions is employed to substitute for either stress or strain. Expressing strain energy in terms of either stress or strain gives the two bounds for the composite spheres method.

Figure 7:
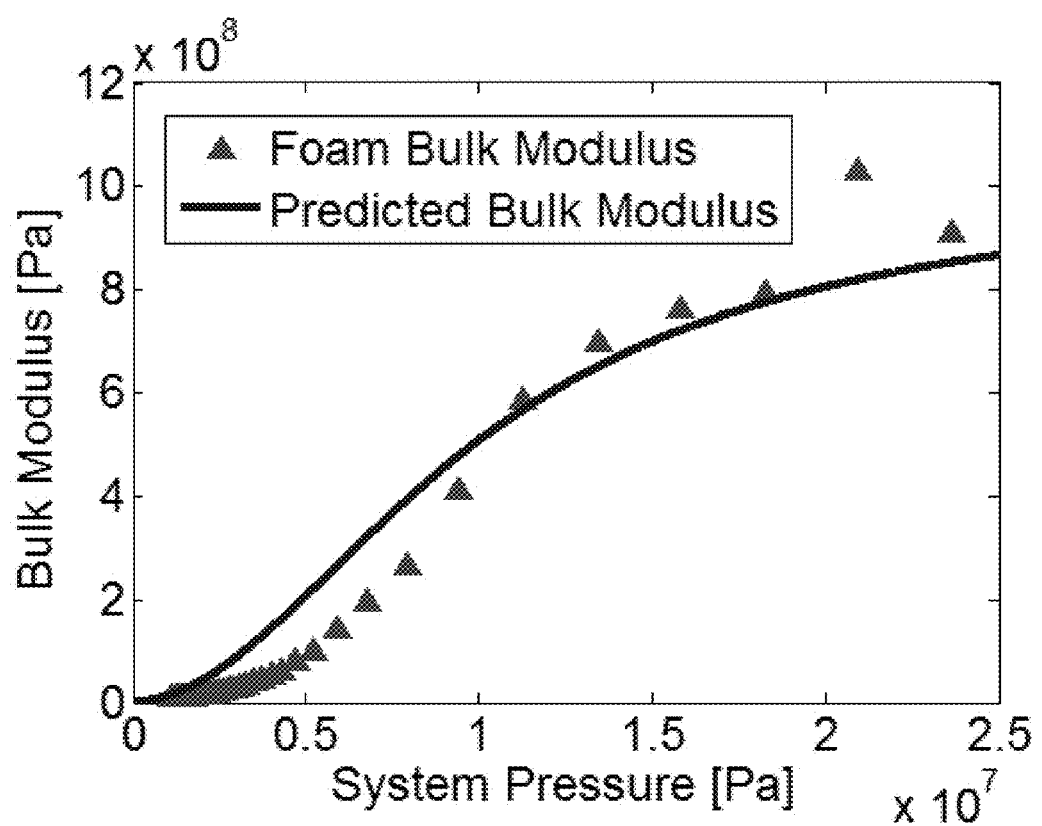
FIG. 7 is a graph of the predicted bulk modulus from composite spheres method compared to measured data.

Variational calculus is then used to account for the inclusion of the insert phase. To solve for the equivalent bulk modulus, attraction is assumed to act on the surface of the matrix, and continuity equations of stress and displacement are applied at the boundary between matrix and inclusion. Applying the two strain energy equations gives the bounds for the equivalent bulk modulus. Analyzing the upper and lower bounds for the bulk modulus reveals they are mathematically equivalent; therefore, the composite spheres method gives the effective bulk modulus of the composite based only on the physical parameters of the host matrix, the inclusions and the volume fraction. The effective bulk modulus, K*, is given by $$K^* = K_m + (K_i - K_m)\frac{(4G_m + 3K_m)c}{4G_m + 3K_i + 3(K_m - K_i)c}, \quad (5)$$

where K is the bulk modulus, G is the Shear modulus, c is the volume fraction and subscripts m and i represent the matrix and inclusions, respectively. The model was used to predict bulk modulus of a syntactic foam. The results of the prediction vs. experimentally measured bulk modulus for a current generation syntactic foam are shown in FIG. 7, indicating good agreement.

The modeling efforts currently only model the static properties of the foam; the foam is known to have frequency-dependent behavior. In order to adequately predict the behavior of the foam, the model needs to account for this behavior. The model also needs to account for pressure dependent moduli of the host matrix/urethane as well as to predict the lossiness (damping) behavior of the composite.

A model is being developed that fully captures the relevant phenomena in order to optimize the behavior of the foam for a given usage criteria. In addition, modeling work is being conducted to predict and characterize the effects of any sphere alterations, such as internal pressure or a change in composition.

An optimization routine can find which composition of foam will best treat noise. For flexible systems, i.e. systems that have varied usage, the optimal solution will need to treat noise for all usages. For systems with a prescribed usage, the optimal solution can directly target noise.

Figure 8:
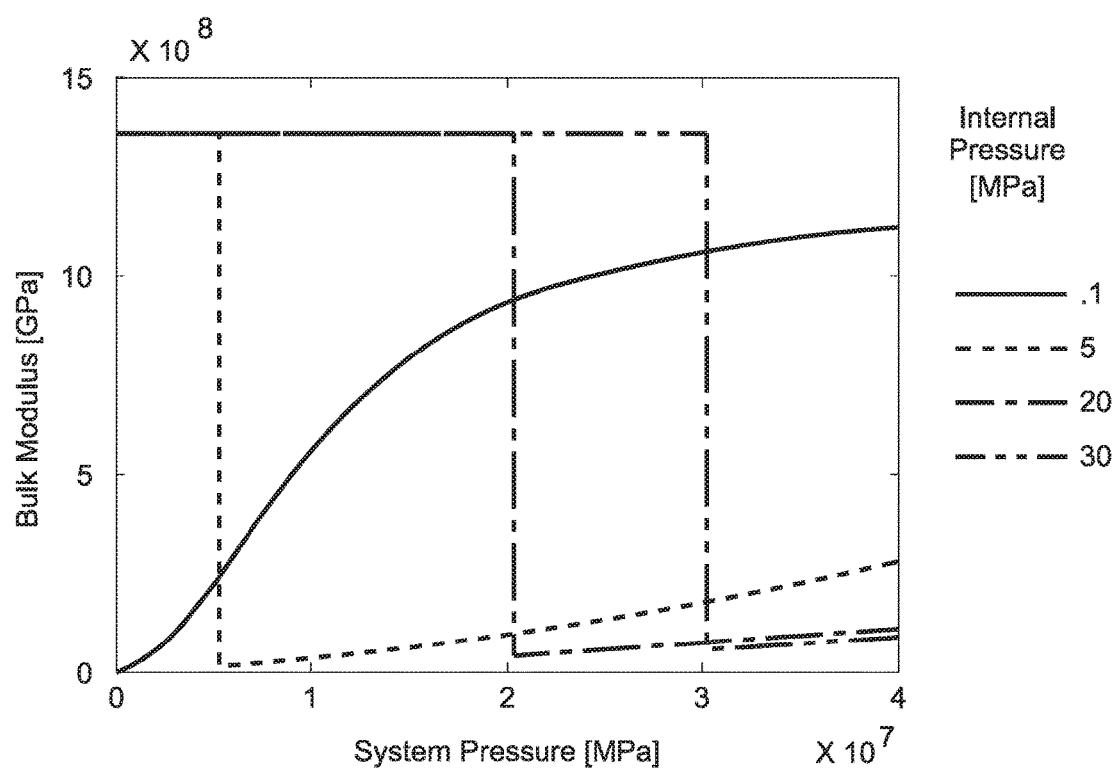
FIG. 8 is a graph of the predicted bulk moduli over system pressure for a range of internal pressures.

Conventional foam uses thin-walled microspheres with atmospheric internal pressure to create the voids within the foam. The composite spheres method outlined above can be used to predict the behavior of the foam if the voids have residual pressure, like that of the present invention. The predicted bulk modulus of syntactic foams with elevated residual pressures in the microspheres is shown in FIG. 8.

The increase of internal pressure stiffens the void against excessive shrinkage, which allows the foam to remain compliant to higher pressures, which is necessary for noise control at elevated pressures. A drawback to increasing the internal pressure is the spheres do not buckle at low pressures and will not treat noise at that pressure. At a system pressure of 40 MPa there is a large difference in bulk modulus between an internal pressure of 0.1 MPa, approximately atmospheric pressure, and 5 MPa; however there is not a large difference between an internal pressure of 5 MPa and 30 MPa.

This suggests that a charge pressure on the order of 5 to 10 MPa is sufficient to have high pressure compliance without increasing the buckling pressure significantly. These results suggest that a syntactic foam made with a mix of microspheres with a distribution of residual pressures can be advantageous for materials that are intended to be functional across a broad range of static pressures.

The present invention includes syntactic foams with homogeneous residual pressurization, as well as distributions of residual pressurizations.

Application of syntactic foam to hydraulic components and noise control devices require a means to tailor or optimize the material for the target system parameters, such as system pressure and spectral content of noise. Therefore, design tools are being developed to permit optimization of the foam's composition, by implementing the design parameters of the foam within an optimization algorithm. An appropriate objective function would be an element of this optimization, and would be used to find the optimal design detail of the foam.

The present invention further comprises methods of manufacturing syntactic foams with residual internal pressurization. As discussed above, current technology only provides microspheres manufactured with a process at ambient pressure, 0.1 MPa, and no means (prior to the present invention) was known that would permit residual internal pressurization in the initial sphere manufacturing.

In an exemplary embodiment, the internal pressure is raised after microsphere manufacture (using conventional means). The invention exploits diffusion across the walls of the microspheres as a means to charge them. Essentially, the microsphere wall acts as a membrane and gas can be diffused across it. However, once pressurized, the gas will diffuse back out of the microspheres, reducing the internal pressure, unless a means were found to dramatically slow the diffusion—long enough to permit the microspheres to be compounded with the host matrix of the composite material.

One focus of research into these hurtles addresses both of these aspects of producing a real material; the diffusion process for charging the spheres, and a diffusion-slowing process for trapping the charged pressure.

The gas diffusion process that we seek to exploit is embodied in Fick's second law in spherical coordinates:

$$\frac{\partial C}{\partial t} = D\left(\frac{\partial^2 C}{\partial r^2} + \frac{2}{r}\frac{\partial C}{\partial r}\right) \quad (6)$$

where C is concentration, D is the diffusion coefficient of a given membrane and permeant (that which is diffusing across the membrane) and r is the radial coordinate. Equation (6) indicates that the time rate of change of the concentration of the charge gas (effectively, the pressure) will vary as a function of the diffusion constant D and the distribution of the gas.

In one embodiment of the present invention, diffusion through the walls of the spheres is exploited to charge them, and then another process reduces the diffusion constant, trapping the gas in the spheres. This innovative two-step process, the gas charging step and the gas trapping step, are examined.

Figure 9:
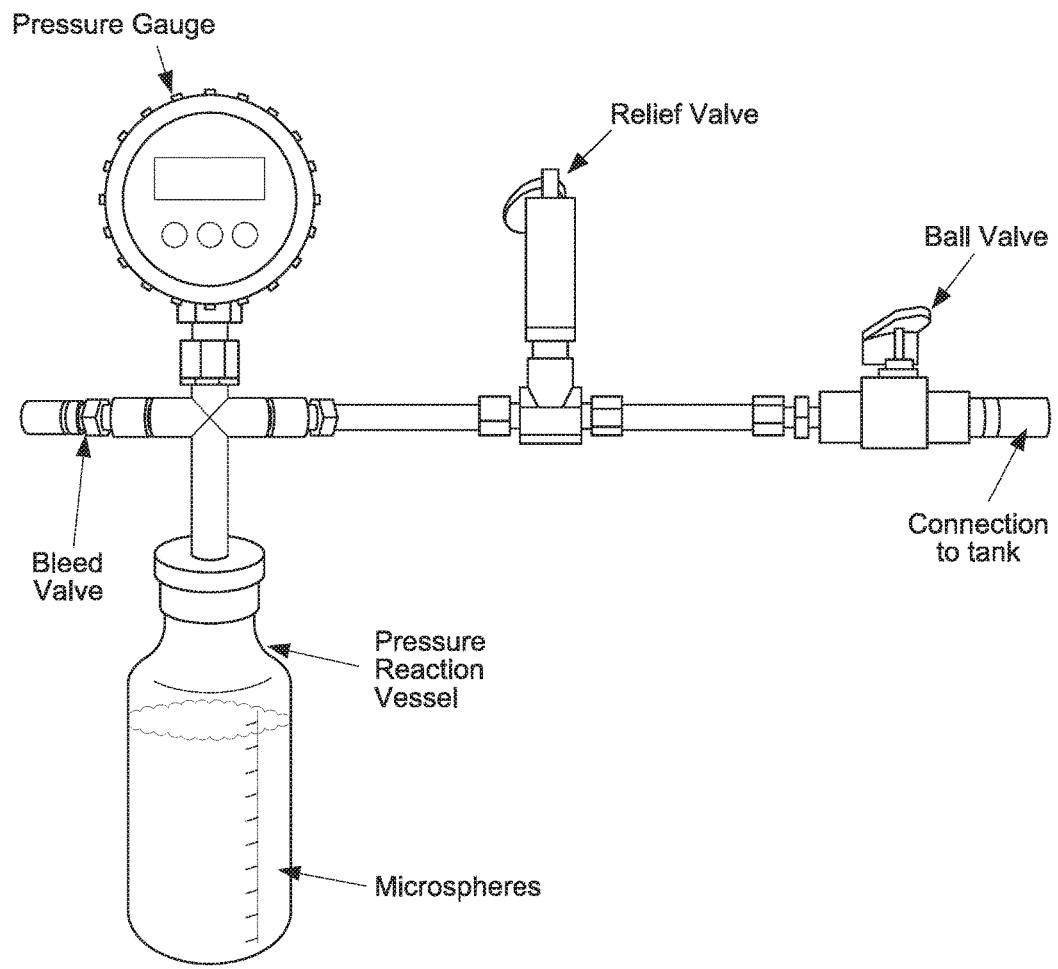
FIG. 9 is an exemplary gas-diffusion test rig.

As a demonstration of the potential feasibility of a diffusion-charging concept, a rig depicted in FIG. 9 was designed to expose microspheres to elevated pressure within a vessel. The increased pressure in the vessel allows the charging gas (nitrogen, in this instance) to diffuse into the microspheres. The internal pressure of the spheres cannot be measured directly; instead, the internal pressure is indirectly indicated by venting the pressure of the system to ambient and then resealing the system; as gas diffuses back out of the microspheres, the pressure should rise in the system; this is a measurable phenomenon, called here the repressurization.

Figure 10:
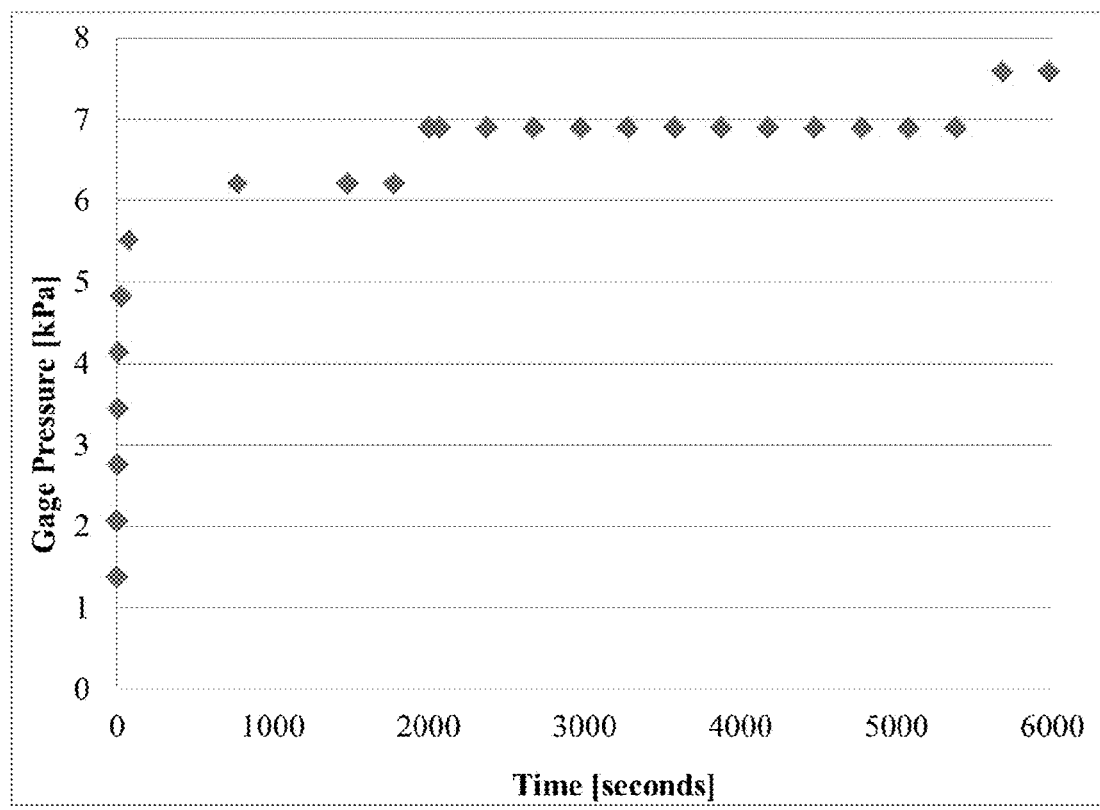
FIG. 10 is a graph of repressurization vs. time.

The measured repressurization versus time for a sample of microspheres exposed to 150 kPa overpressure are presented in FIG. 10. The resolution of the pressure gage is low leading to the data appear to jump between discrete values, e.g. as observed between 5000 and 6000 seconds. Clearly, since the pressure in the vessel increased after having been vented and sealed, the microspheres had acquired an internal pressurization above atmospheric pressure.

Also implied by FIG. 10 is that the gas quickly diffused back out of the spheres, typically within 90 seconds, which is not enough time for the processed spheres to be cast into, for example, a urethane matrix, since the casting process can takes approximately 14 hours. Thus, the spheres need to be altered in order to contain pressure long enough to be cast into the matrix. Note that once the urethane matrix is fully set, it provides an additional barrier against gas diffusion, further trapping the residual pressure within the microspheres. The means to trap the gas diffused into the spheres is a second key element in the process development task of the present invention.

The choice of gas for charging the microspheres can be varied, as well as the time-profile of the pressurization process. Note that the spheres cannot be exposed to a high pressure immediately, as such could cause immediate buckling, and limit the mass of gas that would diffuses into the interior of the buckled shell (diffusion would still happen, but since the collapsed sphere has reduced interior volume, there would be less net mass transport into that volume). Therefore, the charging pressure must be increased gradually; the rate of increase must closely follow the diffusion rate and consequent pressure rise inside the spheres.

Gas-diffusion charging time profiles are being explored to determine an optimal minimum-time charging profile for the applied pressure. The analytical modeling of the gas charging process (and diffusion out) will use Fick's second law, introduced above. In addition to the time response of the charging pressure, various candidate gases are investigated, since the diffusion constant D in Fick's law depends on the specific gas and shell-wall material combination.

In exploring the second step—the gas trapping step—exposing the material to fluorine gas, of any concentration, decreases the diffusion coefficient, and thereby increases the diffusion time across the material by up to three orders of magnitude. A fluorinated microsphere can contain an elevated internal charge pressure for a sufficient time interval to be cast into a syntactic foam composite, where, once cured, the matrix/urethane provides an additional barrier to gas diffusing out of the microsphere.

Fluorine is the most electronegative element; it will bond with most compounds, both organic and inorganic, and is extremely hazardous to humans. Therefore, extreme care must be used when handling the material as well as in system design for handling it. Fluorine corrosion is accelerated at pressures above atmospheric pressure, necessitating the use of corrosion-resistant high-nickel alloys such as Monet 400 for the fluorination system.

While the proof-of-concept for the diffusion charging step was developed, the cost and hazards of handling fluorine gas has been a barrier for further development. Further investigation seeks to remove this barrier, through design and fabrication of a charging rig capable of safely implementing a fluorination step into the process.

Figure 11:
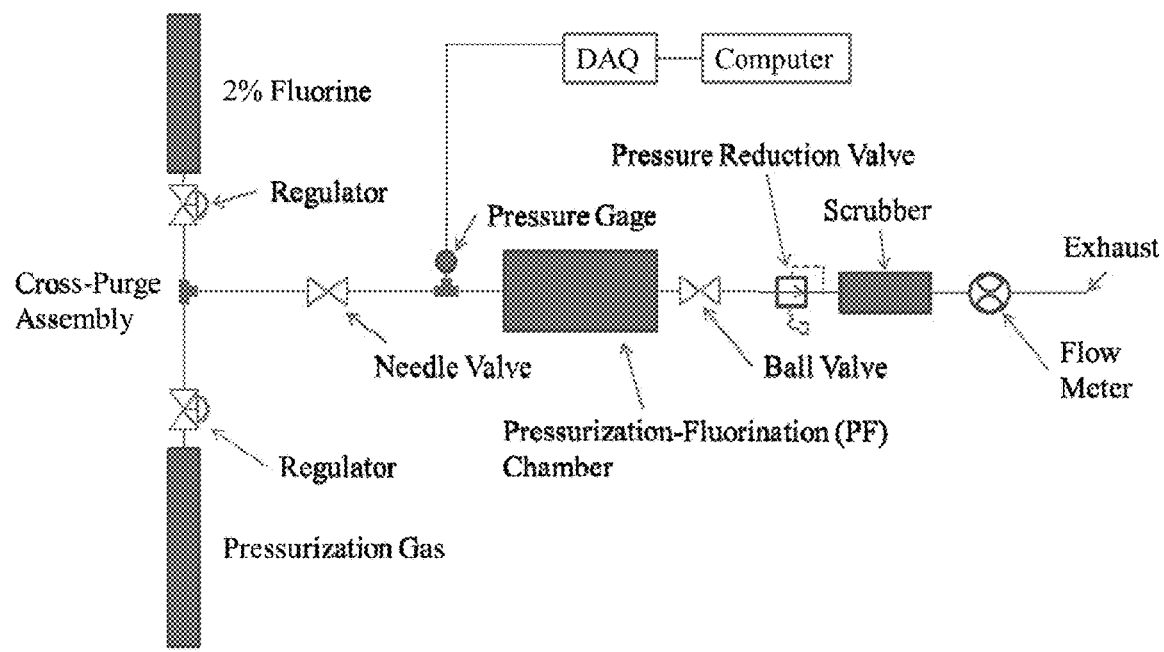
FIG. 11 is an exemplary pressurization-fluorination rig, not to scale.

A schematic of an exemplary pressurization-fluorination rig is shown in FIG. 11. The rig has the capability to diffuse gas into microspheres similar to the diffuser rig depicted in FIG. 9, but also to fluorinate the outer surface of the microspheres. The microspheres—to be pressurized and fluorinated—are housed within the pressurization-fluorination chamber. After pressurization with the charge gas is completed, the system connects to a source of dilute fluorine.

Fluorine gas is supplied to the system until the outer surfaces of the microspheres are fluorinated, for example, to a depth of approximately 20 angstroms. After the target fluorination depth is achieved, a nitrogen or air purge flushes remaining fluorine from the system. The gas flowing through the system is processed through a scrubber (containing a slurry of limestone) to remove fluorine, thereby permitting safe venting of the process gas. Safety systems are in the vicinity of the rig to continually monitor for and alarm if fluorine has leaked from the system.

The product of the gas diffusion/trapping process is volumes of microspheres with elevated residual pressurization. The microspheres are then cast into syntactic foam samples for material characterization and measurements. Material can enable fabrication of liners for use in prototype in-line suppressors.

Elevated pressure syntactic foam liners can be integrated into existing in-line suppressor shells and tested for their performance. No detailing housing designs are required, as the liners will be formed as "drop-in" components within existing bladder-style housings. As such, the present invention represents a device that could be readily commercialized and used within existing hydraulic systems, due to the component-level compatibility of the device with current practice.

It has been shown that the present invention bridges the conventional technology gap to provide a syntactic foam with elevated residual pressurization. It is functional to higher system pressures than conventional syntactic foams made with currently available technologies.

Thus, while convention syntactic foam of a host urethane embedded with hollow microspheres has been shown to be an effective method to treat pressure pulsations, also known as noise, within a hydraulic system, the conventional foam becomes less effective with increasing system pressure, particularly ineffective above 7 MPa.

The present invention illustrates that increasing the initial internal pressure of a microsphere allows voids within the foam to retain their size at pressures up to 35 MPa and the foam will remain compliant at those pressures. Changing the mechanical properties of the conventional host urethane does not have a drastic impact on the overall performance unless the properties have been reduced to the approximate order as the properties of the void. The factors with the most consequence on noise control effectiveness are the internal pressure of the microspheres and system pressure, where such insights are exploited in the present invention.

Numerous characteristics and advantages have been set forth in the foregoing description, together with details of structure and function. While the invention has been disclosed in several forms, it will be apparent to those skilled in the art that many modifications, additions, and deletions, especially in matters of shape, size, and arrangement of parts, can be made therein without departing from the spirit and scope of the invention and its equivalents as set forth in the following claims. Therefore, other modifications or embodiments as may be suggested by the teachings herein are particularly reserved as they fall within the breadth and scope of the claims here appended.

What is claimed is:

1. A composite material comprising:
a host matrix; and
inclusions dispersed in the host matrix;
wherein at least a portion of the inclusions comprise microspheres having an internal pressure of greater than 0.1 MPa.

2. The composite material of claim 1, wherein at least a portion of the microspheres have an internal pressure of greater than 1 MPa.

3. The composite material of claim 1, wherein at least a portion of the microspheres have an internal pressure of greater than 5 MPa.

4. The composite material of claim 1, wherein at least a portion of the microspheres have an internal pressure of between 5 MPa and 10 MPa.

5. The composite material of claim 1, wherein at least a portion of the microspheres comprise polymer microspheres.

6. The composite material of claim 1, wherein the host matrix comprises urethane.

7. The composite material of claim 1, wherein the host matrix comprises silicone rubber.

8. The composite material of claim 1, wherein at least a portion of the microspheres having an internal pressure of greater than 0.1 MPa comprise a charge gas.

9. The composite material of claim 8, wherein the composition of the charge gas comprises nitrogen.

10. The composite material of claim 8, wherein the composition of the charge gas comprises isobutene.

11. The composite material of claim 1, wherein the composite material comprises a syntactic foam.

12. A syntactic foam comprising:
a host matrix; and
inclusions dispersed in the host matrix;
wherein at least a portion of the inclusions comprise microspheres containing a charge gas and having an internal pressure of between 1 MPa and 10 MPa.

13. The syntactic foam of claim 12, wherein at least a portion of the microspheres have an internal pressure of greater than 5 MPa.

14. The syntactic foam of claim 12, wherein the composition of the charge gas is selected from the group consisting of nitrogen and isobutene.

15. The composite material of claim 12, wherein at least a portion of the microspheres have internal pressures different from one another.

16. The composite material of claim 12, wherein at least a portion of the microspheres have charge gas compositions different from one another.

17. A process of making the syntactic foam of claim 12 comprising:
providing the host matrix with the microspheres, each microsphere having a wall and an internal pressure of less than 1 MPa; and
diffusing a gas through the walls of at least a portion of the microspheres, wherein the internal pressure of the microspheres is raised to between 1 MPa and 10 MPa.

18. The process of claim 17 further comprising reducing the diffusion constant of the walls of at least a portion of the microspheres.

* * * * *